United States Patent
Herrmann

(10) Patent No.: US 6,516,258 B1
(45) Date of Patent: Feb. 4, 2003

(54) METHOD FOR DETERMINING CONTROL DATA FOR DEPLOYING RESTRAINT ELEMENTS IN A VEHICLE PRIOR TO A COLLISION

(75) Inventor: Thomas Herrmann, Gauting (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/647,652

(22) PCT Filed: Feb. 9, 1999

(86) PCT No.: PCT/DE99/00330

§ 371 (c)(1),
(2), (4) Date: Dec. 6, 2000

(87) PCT Pub. No.: WO99/51467

PCT Pub. Date: Oct. 14, 1999

(30) Foreign Application Priority Data

Apr. 3, 1998 (DE) .......................................... 198 15 002

(51) Int. Cl.$^7$ ................................................. G06F 7/00
(52) U.S. Cl. ................... 701/45; 180/232; 180/268; 180/269; 180/271; 280/734; 340/435; 340/438; 340/902; 340/903
(58) Field of Search ...................... 701/45, 46; 180/232, 180/268, 269, 271; 280/734, 735; 340/435, 436, 438, 902, 903

(56) References Cited

U.S. PATENT DOCUMENTS 3,760,414 A    9/1973   Nicolson
5,365,114 A *  11/1994  Tsurushima et al. ....... 307/10.1
5,398,185 A *  3/1995   Omura
6,032,097 A *  2/2000   Iihishi et al. .................. 701/96
6,238,163 B1 * 5/2001   Springer et al. ............. 414/401

FOREIGN PATENT DOCUMENTS

DE    39 22 085      1/1991
DE    44 42 189      5/1996
EP    0 882 624      12/1998

OTHER PUBLICATIONS

Grösch et al., Third International Symposium on Sophisticated Car Occupant Safety Systems, Airbag 2000, Karlsruhe, Nov. 26–27, 1996, pp. 16–1 to 16–20.**
Hans Sples, Sensors for detecting seat occupancy, Third International Symposium on Sophisticated Car Occupant Safety Systems, Karlsruhe, Nov. 26–27, 1996, pp. 17–1 to 17–12.**

* cited by examiner

*Primary Examiner*—Gertrude Arthur
(74) *Attorney, Agent, or Firm*—Kenyon & Kenyon

(57) ABSTRACT

A method is indicated according to which the triggering of a restraining device or devices in a vehicle can be adjusted to specific characteristics of the vehicle involved in the impending crash in such a way as to furnish optimum protection for the vehicle occupants. To this end, before a crash between two vehicles, each vehicle transmits data concerning its own vehicle-specific characteristics that can affect the course of the crash, and each vehicle receives the vehicle-specific data transmitted by the other vehicle and derives from them control data for triggering its restraining device or devices.

6 Claims, 1 Drawing Sheet

METHOD FOR DETERMINING CONTROL DATA FOR DEPLOYING RESTRAINT ELEMENTS IN A VEHICLE PRIOR TO A COLLISION

This application is a national-stage filing under 35 U.S.C. § 371 of PCT/DE99/00330 filed on Feb. 9, 1999.

FIELD OF THE INVENTION

The present invention concerns a method for determining control data for triggering a restraining device or devices in a vehicle, according to which information is transmitted between two neighboring vehicles which is used in activating the restraining device or devices in the event of a crash.

BACKGROUND INFORMATION

Many different restraining devices designed to protect vehicle occupants—e.g. front airbags, side airbags for the head and chest regions, knee airbags, seat-belt pretensioners, etc.—will be installed in vehicles in the future. The purpose of these restraining devices is to offer vehicle occupants optimum protection against injury in as many different accident situations as possible. It would be contrary to this purpose to trigger the restraining devices independently of various parameters such as, for example, the severity of the accident, the direction of impact, the sitting position of the vehicle occupants and the like. To do so would even raise the risk that the restraining devices themselves might injure the occupants in being triggered. There is, therefore, an expressed need for the "intelligent" triggering of restraining devices based on the aforesaid parameters, as suggested by the conference report of the Third International Symposium on Sophisticated Car Occupant Safety Systems, Airbag 2000, Karlsruhe, Nov. 26–27, 1996, pp. 16-1 to 16-20.

Vehicles are already commonly equipped with seat occupancy sensors, which detect whether a vehicle seat is in fact occupied and whether, given the instantaneous sitting position of the vehicle occupant, the triggering of restraining devices will protect the occupant or will instead cause injuries. Sensors for detecting seat occupancy are described, for example, on pp. 17-1 to 17-12 of the above-cited conference report cited above.

It is also apparent from the same document that the appropriate triggering of restraining devices, especially of side airbags, is possible only if an impending crash is detected in advance. So-called pre-crash sensors, preferably based on the radar principle, are used for this purpose. With the aid of such pre-crash sensors, it is possible to detect at an early stage the direction from which the impending crash is likely to come and the nature of the obstacle causing the crash, for example a moving vehicle or a rigid object.

A method set forth by way of introduction, according to which information concerning the distance between neighboring vehicles is transmitted between them, is described in German Published Patent Application 44 42 189. This distance information is used in the activation or preparation of restraining devices for protecting the vehicle occupants in the event of a crash between the two vehicles.

The information concerning the distance between the two vehicles does not in itself bring about a notable improvement in the adjustment of the triggering behavior of the restraining devices to the course of a crash that may ensue. An object of the invention is, therefore, to indicate a method which makes it possible to adjust the triggering behavior of the restraining device or devices to the course of the crash in the greatest possible degree, thereby affording the vehicle occupants optimum protection.

SUMMARY OF THE INVENTION

The aforesaid objective is achieved in that each of two neighboring vehicles transmits to the other information concerning its own vehicle-specific characteristics that can affect the course of an impending crash.

It is particularly advantageous to modulate these vehicle-specific data upon the transmitted signals of pre-crash sensors of the vehicles. The vehicles then do not need any communication arrangement of their own for these vehicle-specific data. The transmitted signals of the pre-crash sensors can be modulated with the vehicle-specific data with respect to frequency or amplitude or phase or pulse width. The transmission medium for the pre-crash sensors can be microwaves or light waves or ultrasonic waves.

It is advantageous that the vehicle-specific data modulated on a transmitted signal are not demodulated by a receiver until the pre-crash sensor receiving the transmitted signal has measured a distance to the other vehicle that is below a presettable threshold.

Characteristics that can be transmitted as vehicle-specific signals are, for example, the weight of the vehicle and/or its front body structure and/or its body rigidity and/or the model of vehicle and/or the vehicle speed. When a vehicle receives these vehicle-specific data transmitted by the other vehicle involved in the crash, it can derive from them appropriate control data for its restraining device or devices, so that only such restraining device or devices will be activated, in such a chronological sequence and with such force, as will optimally protect the occupants of the vehicle during the crash.

DETAILED DESCRIPTION

Figure 1:
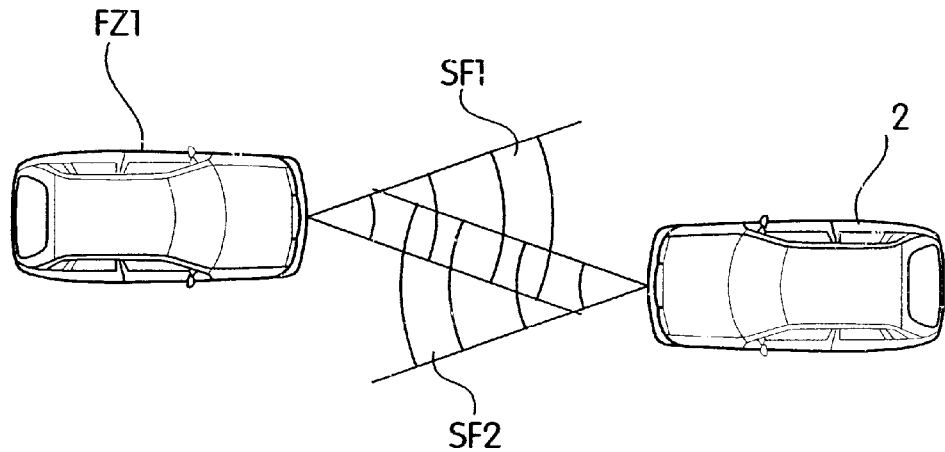
FIG. 1 is a plan view of two vehicles before an impending crash.

FIG. 1 shows two vehicles FZ1 and FZ2 equipped with pre-crash sensors at their front ends and moving toward each other head-on. Radiation fields SF1 and SF2 emanating from the pre-crash sensors are indicated in FIG. 1. Pre-crash sensors operate in a known manner according to the radar principle, according to which they radiate a transmitted signal and receive back the signal reflected by an object located in the radiation field. Distances from obstacles can then be determined from signal propagation times or by the analysis of frequency spectra via fast Fourier transformation. The relative speeds of two vehicles traveling toward each other can also be determined from the Doppler effect. The information as to the relative distance between two vehicles can then be used to determine whether a collision between the two vehicles FZ1 and FZ2 is imminent, so that restraining device or devices to protect the vehicle occupants can then be activated accordingly. As radiation fields SF 1 and SF2 in FIG. 1 indicate, vehicles FZ1 and FZ2 have pre-crash sensors only at their front ends. Such pre-crash sensors can also, however, be disposed all around the vehicle, so that the entire space surrounding the vehicle can be observed for obstacles causing a crash. Especially important are pre-crash sensors on the sides of the vehicle, since they can initiate the timely release of side airbags.

Figure 2:
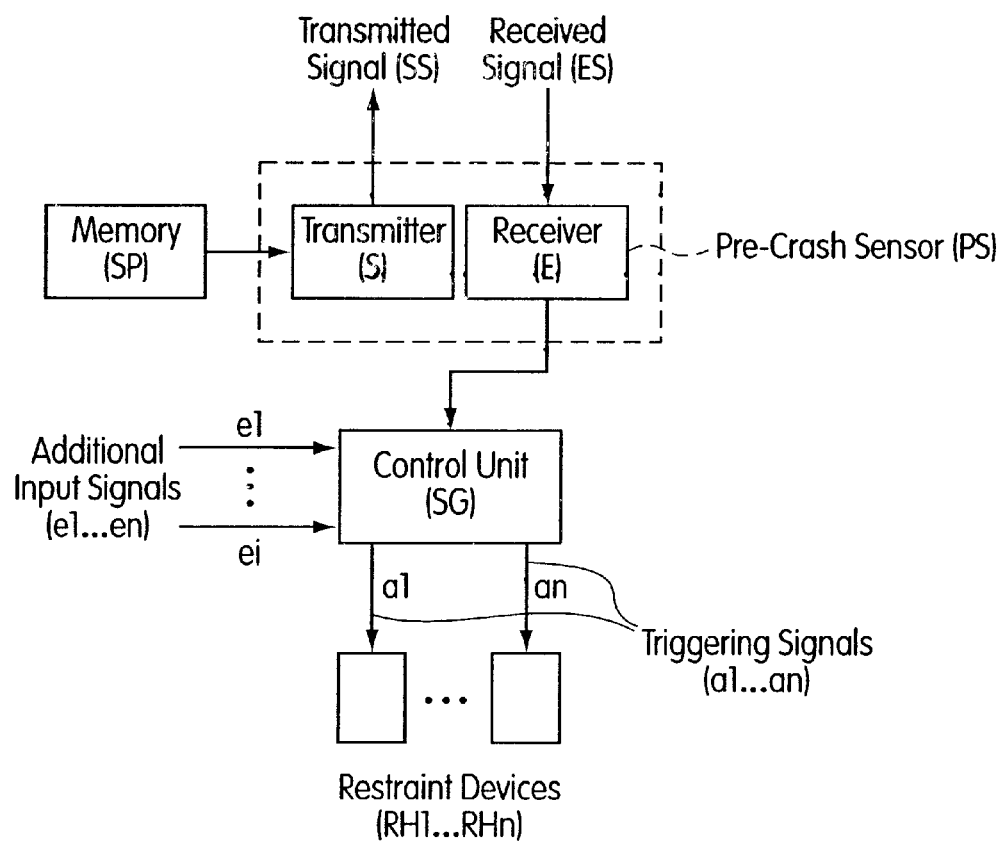
FIG. 2 is a block diagram of a pre-crash sensor via which control data for triggering a restraining device or devices are transmitted.

The block diagram in FIG. 2 shows that a pre-crash sensor PS in a vehicle has a transmitter S and a receiver E.

Transmitter S radiates, in a known manner, a transmitted signal SS that is at least partially reflected by an object located in its radiation field. The reflected signal arrives as received signal ES at a receiver E, in which a signal analysis takes place that yields the relative distance of the vehicle from the obstacle. In known FMCW radar, spectral analysis takes place in receiver E, the distance to the confronted obstacle being derived from the shift in spectral components. The distance information is communicated by receiver E to a control unit SG, which in the event of an actual crash, delivers triggering signals a1, . . . , an to one or more restraint devices RH1, . . . , RHn. Control unit SG normally also receives, from other sensors, additional input signals e1, . . . , ei that have an effect on the triggering of restraint devices RH1, . . . , RHn.

Some vehicle-specific data are stored in a memory SP, which, for example, can also be integrated into control unit SG. These data can include, for example, the model of the vehicle, the weight of the vehicle, the structure of the front of the vehicle body, the rigidity of the vehicle body, and other quantities describing the characteristics of the vehicle concerned. The data are, in any event, vehicle-specific quantities that can affect the course of the crash. These vehicle-specific data, which also can include the speed of the vehicle, are modulated in transmitter S onto transmitted signal SS, for which purpose either frequency modulation or amplitude modulation or phase modulation or pulse-width modulation can be used. Receiver E of pre-crash sensor PS of an oncoming vehicle receives modulated transmitted signal SS, demodulates the transmitted signal SS, and thus obtains the vehicle-specific data of the other vehicle. Control unit SG then derives from the received vehicle-specific data those triggering signals a1, . . . , an for restraint devices RH1, . . . , RHn that are appropriate for the course of the crash which can be anticipated based on the characteristics of the other vehicle. These vehicle-specific data of the oncoming vehicle guide, for example, the choice of the restraint devices to be activated, the chronological sequence of activations, and also the force with which, for example, the airbags are inflated in one or more stages.

Whereas transmitted signal SS of a given pre-crash sensor is continuously modulated with the vehicle-specific data, it makes sense not to perform the demodulation in receiver E of the signal transmitted by the oncoming vehicle until pre-crash sensor PS measures a distance to the other vehicle that is below a preset threshold, at which point it can reliably be assumed that a collision between the two vehicles is about to take place.

What is claimed is:

1. A method for determining control data for triggering at least one restraining device in a vehicle, comprising the steps of:

transmitting information between neighboring vehicles by causing each one of the neighboring vehicles to transmit to each other data relating to vehicle-specific characteristics capable of affecting a course of an impending crash; and activating the at least one restraining device on the basis of the transmitted information in the event of the crash.

2. The method according to claim 1, further comprising the steps of:

equipping each vehicle with at least one pre-crash sensor based on a radar principle; and modulating the vehicle-specific data of each vehicle onto a transmitted signal radiated by the at least one pre-crash sensor of the corresponding vehicle.

3. The method according to claim 2, further comprising the step of:

preventing a receiver from demodulating the modulated vehicle-specific data until the at least one pre-crash sensor receiving the transmitted signal in one of the vehicles has measured a distance to the other vehicle that is below a preset threshold.

4. The method according to claim 3, wherein:

the at least one pre-crash sensor emits one of microwaves, light waves, and ultrasonic waves.

5. The method according to claim 2, wherein:

the step of modulating includes the step of modulating the transmitted signal with the vehicle-specific data with respect to one of a frequency, an amplitude, a phase, and a pulse width.

6. The method according to claim 1, wherein:

the vehicle-specific data includes at least one of a vehicle weight, a structure of a front of a vehicle body, a rigidity of the vehicle body, a vehicle model, and a vehicle speed.

* * * * *